Figure 1:
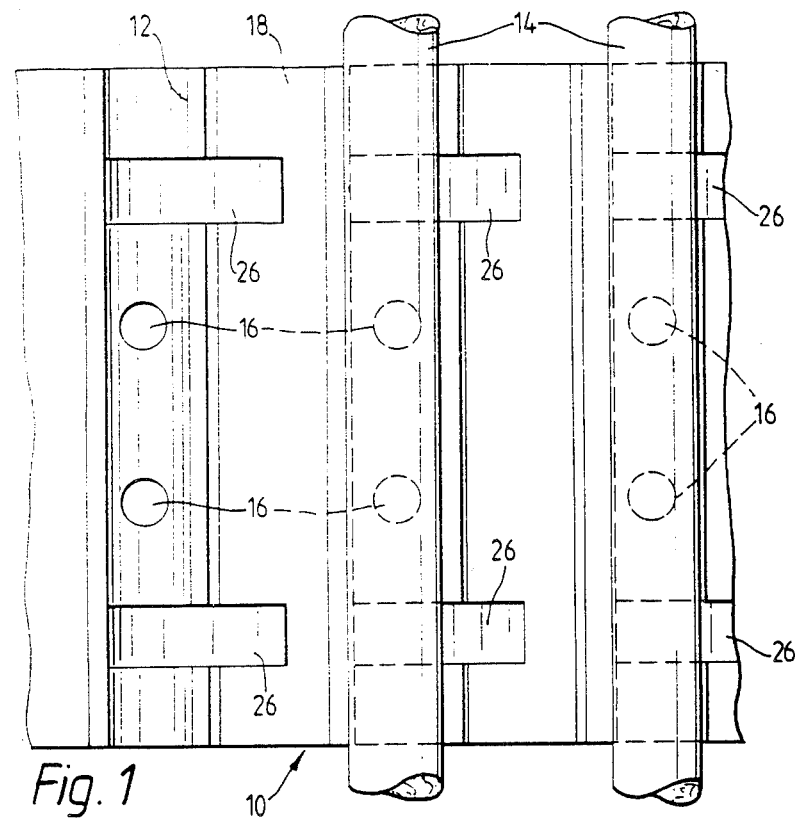

United States Patent [19]

Bolt

[11] Patent Number: 4,489,736
[45] Date of Patent: Dec. 25, 1984

[54] EJECTION OF FAULTY CIGARETTES

[75] Inventor: Reginald C. Bolt, High Wycombe, England

[73] Assignee: Molins PLC, London, England

[21] Appl. No.: 444,226

[22] Filed: Nov. 24, 1982

[30] Foreign Application Priority Data

Dec. 1, 1981 [GB] United Kingdom ............... 8136215

[51] Int. Cl.³ .............................................. A24C 5/34
[52] U.S. Cl. ................................. 131/282; 131/907;
131/94; 198/493
[58] Field of Search ........................... 131/282, 94, 907;
271/195, 309, DIG. 2; 198/493, 689, 494

[56] References Cited

U.S. PATENT DOCUMENTS

| 3,034,645 | 5/1962 | Groppe | 131/907 |
| 3,158,251 | 11/1964 | Skala et al. | 131/94 |
| 4,311,229 | 1/1982 | Bennett | 198/493 |
| 4,363,332 | 12/1982 | Preston et al. | 131/282 |
| 4,440,388 | 4/1984 | Divoux et al. | 271/195 |

Primary Examiner—Vincent Millin
Assistant Examiner—Harry J. Macey
Attorney, Agent, or Firm—Antonelli, Terry & Wands

[57] ABSTRACT

Apparatus for ejecting cigarettes, comprises a conveyor (10) arranged to carry a sideways-moving row of cigarettes (14) through an ejection station at which there is a nozzle (20) arranged, when a cigarette is to be ejected, to direct a jet of air (32, 34) transversely past the cigarette and onto an air-deflecting surface (26) on the conveyor which deflects the air jet onto the cigarette so as to blow the cigarette transversely off the conveyor.

6 Claims, 2 Drawing Figures

U.S. Patent     Dec. 25, 1984     4,489,736

EJECTION OF FAULTY CIGARETTES

This invention is concerned with devices for inspecting cigarettes and for ejecting faulty cigarettes. In particular, the invention is concerned with means for ejecting faulty cigarettes in a simple but reliable manner. This invention is also applicable to rod-like articles similar to cigarettes (e.g. cigarette filter rods) but will for convenience be described only in terms of cigarettes.

It has been common to eject faulty cigarettes by blowing them axially off the conveyor carrying them, normally a fluted drum. While not always very convenient, that method of ejection is usually possible if, as is common, the cigarettes are travelling as a single row in the region of the ejection station. However, it is possible for the cigarettes to form two rows at the ejection station, one such proposal being the consequence of using an inspection device like that described in FIG. 5 of our British patent application No. 2050804. In that case it is inconvenient to eject faulty cigarettes axially. The present invention enables faulty cigarettes to be ejected transversely: that is to say, if they are being carried by a drum, they leave the drum in an approximately radial direction with respect to the drum.

According to this invention, a cigarette ejection device comprises a conveyor arranged to carry a sideways moving row of cigarettes through an ejection station at which there is a nozzle arranged, when a cigarette is to be ejected, to direct a jet of air transversely past the cigarette and onto an air-deflecting surface on the conveyor which deflects the air jet onto the cigarettes so as to blow the cigarette transversely off the conveyor.

Figure 2:
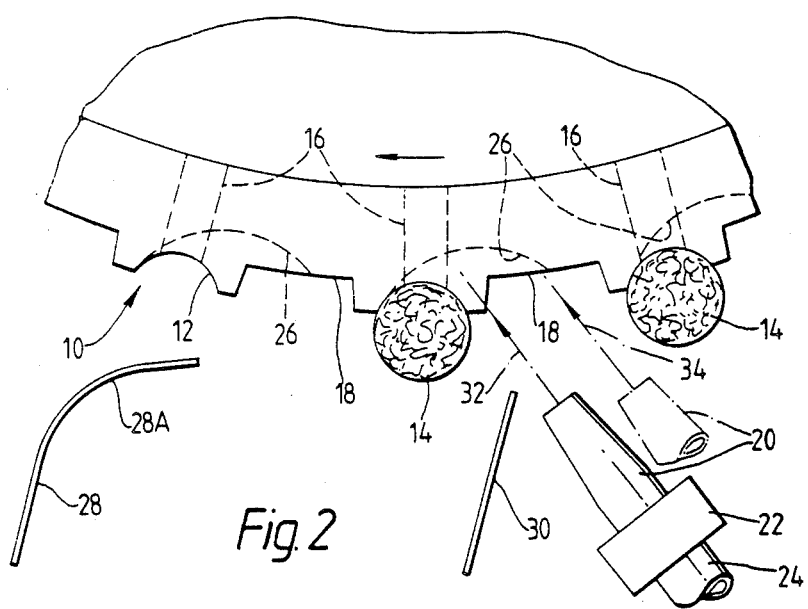

An example of a device according to this invention is shown in the accompanying drawings. In these drawings:

FIG. 1 is a flat-developed view of part of the underneath surface of a fluted drum carrying the cigarettes; and FIG. 2 is a front elevation of the same part of the drum.

The device shown in the drawings includes a fluted drum 10 formed with parallel circumferentially spaced flutes 12 arranged to receive cigarettes 14 which are normally held on the drum by suction applied through radial passages 16; each flute has two such passages. Between the fluted portions of the drum there are recesses 18, but these may be omitted.

The drum 10 is arranged to carry the cigarettes sideways through an ejection station at which there are two ejection nozzles 20; one such nozzle is shown in FIG. 2, the other being behind it. Air is supplied to each nozzle, when a cigarette is to be ejected, by a corresponding solenoid-operated valve 22, inlet pipes 24 to the two valves being connected to a common source of compressed air. Two valves are provided, one for each nozzle, so that the distance of each nozzle outlet from the valve is as short as possible; however, the valves (which carry the nozzle) may be adjustably mounted on a fixed member (not shown) so that their distance apart can be altered to suit drums of different widths which may be used for cigarettes of different lengths.

When a cigarette which is to be ejected reaches the vicinity of the nozzles 20, the valves 22 are opened to emit jets of air which pass along air-deflecting surfaces 26 comprising concave partly-cylindrical grooves machined into the drum. Each deflecting surface 26, in a region adjacent to the corresponding flute 12, is substantially tangential to the flute in cross-section, (i.e. at the left-hand end thereof as seen in FIG. 2). As a result, the jets of air are deflected by the surfaces 26 towards the cigarette which is to be ejected, their velocity and energy being sufficient to blow the cigarette substantially radially from the flute, against the retaining force applied by suction in the passages 16. The ejected cigarette thus drops between guide plates 28 and 30 and into a suitable receptacle (not shown). The guide plate 28 (which is preferably further to the left than is shown in FIG. 2) has a curved upper end portion 28A to deflect downwards cigarettes which impinge on it at high speeds of operation as a result of their tangential component of motion on leaving the drum.

The valves 22 are arranged to open simultaneously for a predetermined period of time. For example, the time period may be approximately such that air jets issue from the nozzles while the cigarette to be ejected moves through approximately one third the distance between successive cigarettes. In FIG. 2 the middle cigarette is shown at approximately the position at which, if it were required to be ejected, the air jets begin; accordingly, the centre-line of each nozzle (corresponding to the central axis of the air jet), as represented by the chain-dotted line 32, extends just past the downstream side of the cigarette. The chain-dotted line 34 represents the position of the nozzle axes relative to the same cigarette when the valves are closed to stop the air jets; it should be noted that an air jet having an axis along the line 34 will be approximately tangential to the right-hand end of the reflecting surface 26 and is inclined by a substantial angle (approximately 30°) to the drum radius at that point.

By this arrangement, the air jets required to eject a cigarette can be applied for a significant period of time corresponding to the time a cigarette takes to move through a distance equal to that between the lines 32 and 34, during which entire period the air jet will be deflected onto the cigarette by the deflecting surface 26.

A conventional electronic or other delay device may be used to open the valves 22 after an appropriate predetermined interval following emission of a fault signal from the cigarette inspection device. There may also be provision to open the valves in order to eject cigarettes for inspection purposes; alternatively, a second pair of nozzles with separate guide plates leading to a separate receptacle may be provided, at a different position around the drum, to eject and collect cigarettes for inspection purposes when necessary Instead of each nozzle having its own valve 22, there may be a single valve controlling the delivery of air to both nozzles.

Instead of the deflecting surfaces extending to the right from the flutes (see FIG. 2), i.e. in the direction opposite to the direction of movement of the flutes, they may extend in the opposite direction; this would in effect reverse the direction of rotation of the drum. However, the arrangement shown is preferred because it results in the air jet approaching the deflecting surface in an approximately tangential direction when the jet velocity has built up to its maximum level; also, there is no risk of the ejected cigarettes hitting the nozzles on account of the tangential component of their motion on leaving the drum.

Instead of there being two nozzles 20, a single nozzle may be mounted at a central position, each flute 12 then having a single deflecting surface 26 lying between the suction passages 16.

By way of example, the pressure of the air supplied to the valves 22 may be approximately 30 pounds per square inch (207000 Pascal). That has been found sufficient to remove cigarettes against the retaining action of a suction pressure in the passages 16 of approximately 14 inches water gauge (3487 Pascal).

It should be noted, finally, that since the nozzles 20 are inclined to an adjacent drum radius by approximately 30 degrees such that the air jets issue from the nozzles with a component in the direction of movement of the cigarettes on the drum. As an alternative, however, the drum may rotate in the opposite direction, though the arrangement shown is preferred.

I claim:

1. Apparatus for ejecting cigarettes comprising: a conveyor with means to carry a sideways moving row of cigarettes through an ejection station; an ejection nozzle located at said ejection station; an air deflecting surface on the conveyor associated with said means to carry a sideways moving row of cigarettes; said ejection nozzle comprising means to direct a jet of air transversely past the cigarette and onto said air deflecting surface on the conveyor which deflects the air jet onto the cigarette so as to blow the cigarette transversely off the conveyor.

2. Apparatus according to claim 1 in which said means to carry a sideways moving row of cigarettes comprises parallel flutes in which the cigarettes are held by suction applied through passages opening out into the flutes.

3. Apparatus according to claim 2 in which each deflecting surface comprises a concave surface which at one end, as viewed in cross-section, is approximately tangential to an associated flute.

4. Apparatus according to claim 3 in which the jet is arranged to be substantially tangential to the deflecting surface at one moment of time during its duration.

5. Apparatus according to claim 4 in which each deflecting surface extends from the corresponding flute in the direction opposite to the direction of movement of the flute, and in which the nozzle is arranged to direct the jet of air in a direction such that the jet, just before stopping, is substantially tangential to the deflecting surface.

6. Apparatus according to claim 2 in which the conveyor is in the form of a drum on which each flute has one or more suction passages inwardly spaced from the ends of the flute, and in which there are two deflecting surfaces, respectively between the suction passages and the two ends of the flute, the apparatus having two nozzles for directing air jets simultaneously onto the respective deflecting surfaces when a cigarette is to be ejected.

* * * * *